United States Patent
Wu et al.

(10) Patent No.: US 11,746,042 B2
(45) Date of Patent: Sep. 5, 2023

(54) METHOD FOR SYNERGISTICALLY PREPARING FERROSILICON ALLOY AND GLASS-CERAMICS FROM PHOTOVOLTAIC WASTE SLAG AND NON-FERROUS METAL SMELTING IRON SLAG

(71) Applicant: BEIJING UNIVERSITY OF TECHNOLOGY, Beijing (CN)

(72) Inventors: Yufeng Wu, Beijing (CN); Xiaomin Liu, Beijing (CN); Bin Li, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 17/993,844

(22) Filed: Nov. 23, 2022

(65) Prior Publication Data
US 2023/0091102 A1 Mar. 23, 2023

Related U.S. Application Data

(63) Continuation of application No. PCT/CN2022/099060, filed on Jun. 16, 2022.

(30) Foreign Application Priority Data

Jun. 29, 2021 (CN) .......................... 202110723985.0

(51) Int. Cl.
*C22C 1/02* (2006.01)
*C03C 10/00* (2006.01)
*C22C 38/02* (2006.01)

(52) U.S. Cl.
CPC ............ *C03C 10/0063* (2013.01); *C22C 1/02* (2013.01); *C22C 38/02* (2013.01)

(58) Field of Classification Search
CPC ................................ C01B 25/01; C01B 25/18
(Continued)

(56) References Cited

U.S. PATENT DOCUMENTS

| | | |
|---|---|---|
| 3,138,455 A | 6/1964 | Carosella |
| 5,002,733 A | 3/1991 | Breton |
| 2020/0048092 A1* | 2/2020 | Wright ..................... C01B 25/18 |

FOREIGN PATENT DOCUMENTS

| | | |
|---|---|---|
| CN | 102942383 A | 2/2013 |
| CN | 103553337 A | 2/2014 |

(Continued)

OTHER PUBLICATIONS

NPL: online translation of CN 113502425 A, Oct. 2021 (Year: 2021).*

*Primary Examiner* — Jie Yang
(74) *Attorney, Agent, or Firm* — J.C. Patents

(57) ABSTRACT

The invention discloses a method for synergistically preparing ferrosilicon alloy and glass-ceramics from photovoltaic waste slag and non-ferrous metal smelting iron slag, and belongs to the technical field of collaborative resource utilization of various smelting slag areas. According to the method, the zinc rotary kiln slag and a reduction tempering agent are subjected to batching, mixing and high-temperature melting to form a reduction-state iron-containing material. The iron-containing material and the silicon slag are further subjected to mixed melting, water quenching and sorting to obtain the ferrosilicon alloy and residual waste slag. The residual waste slag is subjected to tempering, melting, molding, annealing and heat treatment to obtain the glass ceramics. According to the method, the ferrosilicon alloy and the glass ceramics are prepared from the silicon slag and the zinc rotary kiln slag, and a collaborative resource utilization target of the regional smelting slag is achieved. The ferrosilicon alloy is obtained through high- (Continued)

temperature reduction of the zinc rotary kiln slag and chemical combination of the zinc rotary kiln slag and the silicon-rich silicon slag. Because the high-temperature decomposition of silica is not involved, the process greatly reduces the energy consumption, saves the cost and is suitable for industrial popularization and application.

4 Claims, 1 Drawing Sheet

(58) Field of Classification Search
USPC .......................................................... 75/561
See application file for complete search history.

(56) References Cited

FOREIGN PATENT DOCUMENTS

| | | | |
|---|---|---|---|
| CN | 103602846 | A | 2/2014 |
| CN | 105441683 | A | 3/2016 |
| CN | 107653381 | A | 2/2018 |
| CN | 107699701 | A | 2/2018 |
| CN | 108059351 | A | 5/2018 |
| CN | 108624853 | A | 10/2018 |
| CN | 108754143 | A | 11/2018 |
| CN | 109020231 | A | 12/2018 |
| CN | 111254302 | A | 6/2020 |
| CN | 113502425 | A | 10/2021 |
| WO | WO2018014470 | A1 | 1/2018 |
| WO | WO-2023273897 | A1 * | 1/2023 |

* cited by examiner

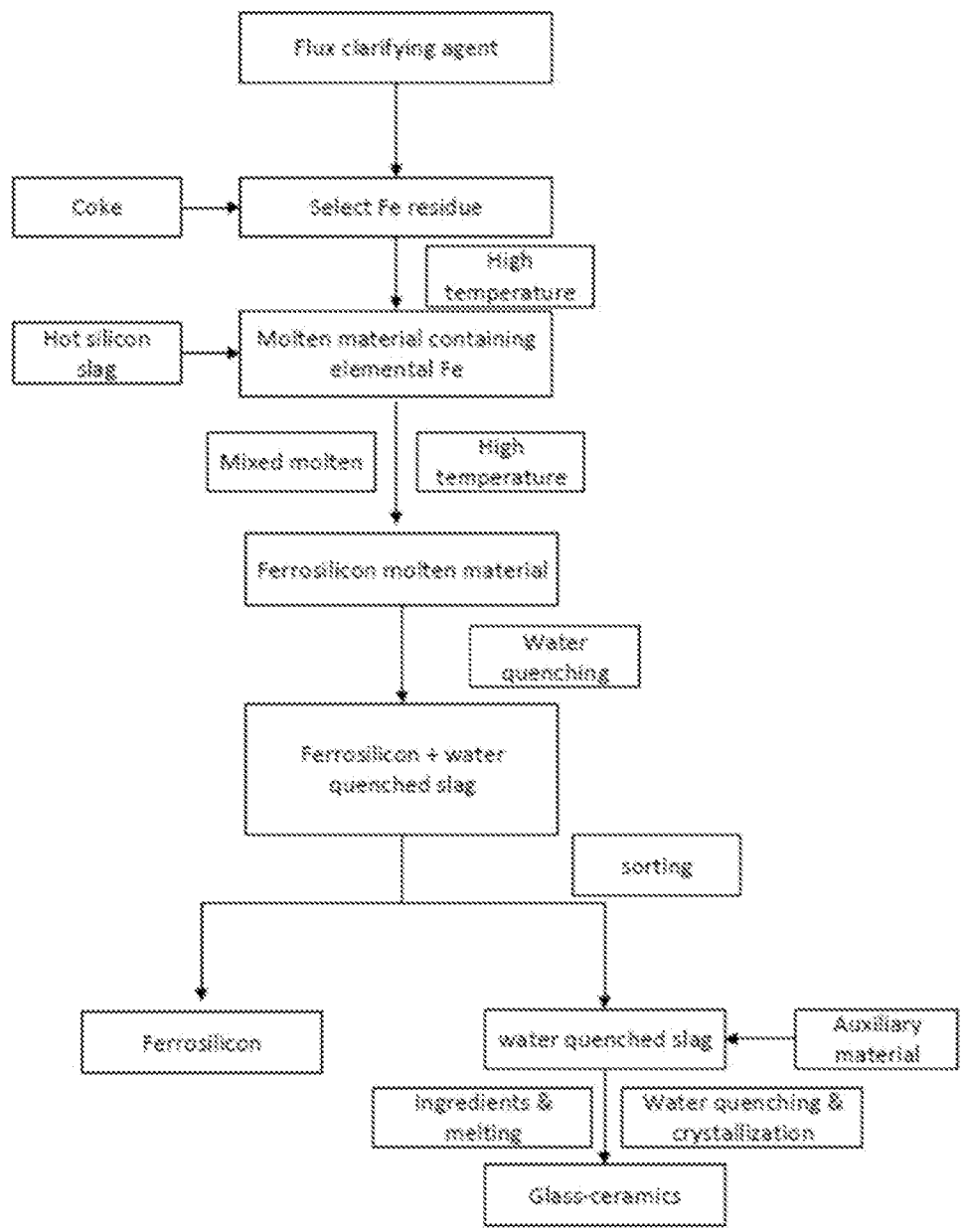

METHOD FOR SYNERGISTICALLY PREPARING FERROSILICON ALLOY AND GLASS-CERAMICS FROM PHOTOVOLTAIC WASTE SLAG AND NON-FERROUS METAL SMELTING IRON SLAG

CROSS-REFERENCE TO RELATED APPLICATIONS

This application is a continuation of the international application PCT/CN2022/099060, filed on Jun. 16, 2022, which claims priority to Chinese application No. 202110723985.0, filed on Jun. 29, 2021, the content of the above identified applications are hereby incorporated by reference in its entirety and made a part of this specification.

TECHNICAL FIELD

The invention belongs to the technical field of coordinated resource utilization of various smelting slag, and in particular relates to a method for synergistically preparing Ferrosilicon alloy and glass-ceramics from photovoltaic waste slag and non-ferrous metal smelting iron slag.

BACKGROUND

Ferrosilicon alloy is an important raw material for steel smelting and casting (such as deoxidizers for steelmaking, reducing agents for ferroalloy production, alloy additives for high-end steel production, etc.), which can effectively improve the mechanical, physical and chemical properties of steel and castings.

The existing ferrosilicon alloy production process is no longer limited to the traditional scheme (shown in Table 1), including using steel scraps, quartz or silica as raw materials and coke as a reducing agent, smelting with an electric furnace at 1900° C. to obtain a high-temperature Ferrosilicon alloy melt, Then, the high-purity ferrosilicon alloy is obtained by mixing and refining with chlorine and nitrogen through the refining ladle.

Some of the research uses solar cells to cut silicon powder directly, scrap steel sheets, and flux at 1580-1620° C. to obtain Ferrosilicon alloys.

The other use the mixture of silica and metallurgical silicon slag as the furnace core material, and react with iron materials such as steel scraps and iron pellets and carbonaceous reducing agents such as blue carbon and coke at high temperature to obtain push-iron alloy. The production process of the above Ferrosilicon alloy involves the generation of harmful gases, and the high melting temperature of some parts leads to the problem of high process cost. The type of raw materials and the melting temperature can be further optimized.

TABLE 1 preparation method of ferrosilicon alloy

| | Main raw material | Auxiliary reagent | Reaction temperature | Reaction mechanism |
|---|---|---|---|---|
| 1 | silica, scrap iron | Carbon (reducing agent) | Electric arc (1900° C.) | (1) $SiO_2 + 2C = Si + 2CO\uparrow$ ($Cl_2$, $N_2$ refining) (2) $ySi + xFe = Fe_xSi_y$, $\Delta G = 167400 - 86.40T$ |
| 2 | Solar cell cutting powder silicon steel sheet | Refining agent: Silica sand, limestone, fluorite, ferric phosphorus; Melting agent: lime; | 1580° C.-1620° C. | (1) $ySi + xFe = Fe_xSi_y$, $\Delta G = -28500 - 0.4T$ |
| 3 | Silica, metallurgical silicon slag, iron filings (steel filings or iron pellets) | Carbon reducing agent (blue carbon or coke) | 1600° C.-1750° C. | (1) $ySi + xFe = Fe_xSi_y$ |

Resource utilization of waste residue is one of the hotspots that has attracted much attention in recent years.

As a type of smelting waste, zinc rotary kiln slag is zinc leaching slag produced in the zinc smelting process. After entering the rotary kiln through the conveyor belt, at a high temperature of 1100-1300° C., the zinc, lead, indium, etc. in the slag are reduced to metal vapor and volatilized in the slag. The residual slag in the flue gas is further oxidized and recovered. These slags are rich in iron elements, and their weight percentages are about 30-42%.

Silicon slag is a high-viscosity oxide slag formed by the oxidation of calcium, aluminum and other impurity elements in silica by compressed air in the industrial silicon smelting process, and a mixed slag formed by part of the elemental silicon wrapped by these oxide slag. A large amount of silicon slag and zinc rotary kiln slag are difficult to prepare high-value products, such as glass-ceramics, because they are rich in iron and elemental silicon, respectively. Exploring a method to reduce the silicon/iron components in the two smelting slag is of great significance for realizing the goal of resource utilization of the waste slag.

SUMMARY

The technical problem to be solved by the present invention is to reduce or eliminate the negative influence of elemental silicon in the silicon slag on the structure and performance of the glass-ceramic, and the overflow phenomenon caused by the high iron content in the zinc rotary kiln slag.

In addition, to overcome the defects of high energy consumption and insufficient environmental protection in the existing ferrosilicon alloy preparation process, a method for preparing Ferrosilicon alloy and glass-ceramic by utilizing silicon slag and rotary kiln slag is provided.

1. In order to solve the above-mentioned technical problems, the present invention provides a method for simultaneously reducing the content of elemental silicon in silicon slag and the content of iron components in lead slag to prepare Ferrosilicon alloy and glass-ceramic. The iron-containing material is converted into a reduced iron-containing material in advance, and the iron-containing material is then smelted and combined with the silicon slag to prepare a Ferrosilicon alloy, and the remaining water-quenched residue is used as a raw material for the preparation of glass-ceramics.

The specific technical solutions are as follows (shown in Table 2):

TABLE 2 preparation method of Ferrosilicon alloy:

| Main raw material | Auxiliary reagent | Reaction temperature | Reaction mechanism |
|---|---|---|---|
| silicon slag and rotary kiln slag | Reducing agent: coke; Flux: albite, borax; | 1450° C.-1550° C. | (1) FeO + C = Fe + CO↑ (2) ySi + xFe = $Fe_xSi_y$ (Water quench sorting) |

The raw materials for the preparation of the Ferrosilicon alloy include zinc rotary kiln slag mixture and silicon slag, whose mass percentages are (45-60) and (40-55) respectively, and the sum of mass percentage of zinc rotary kiln slag mixture and silicon slag is 100%.

The zinc rotary kiln slag mixture includes zinc rotary kiln slag and a reducing and tempering agent, wherein the reducing and tempering agent includes coke, albite, and borax.

The chemical components of the silicon slag are: $SiO_2$, CaO, $Al_2O_3$, $Na_2O$, $K_2O$, MgO, and ZnO, wherein the silicon in the silicon slag exists in the form of elemental silicon, silicon carbide and calcite.

The chemical components of the rotary kiln slag are: $SiO_2$, CaO, $Fe_2O_3$, $Al_2O_3$, ZnO and MgO.

2. In the present invention, the zinc rotary kiln slag and the reducing conditioner are mixed in proportion and crushed to obtain a mixed material, and the mixed material is then melted at a high temperature to form a reduced iron-containing material.

The reduced molten liquid is then mixed with silicon slag, heat-retained and water-quenched to form a water-quenched slag material containing Ferrosilicon alloy.

The water-quenched slag is filtered and sorted to obtain ferrosilicon alloy, and the water-quenched residue can be used for other value-added utilization.

3. The method for synergistically preparing ferrosilicon alloy and glass-ceramics from photovoltaic waste slag and non-ferrous metal smelting iron slag is characterized in that the preparation method of the iron-containing material in the reduced state includes the following main steps:

1) the mass ratio of zinc rotary kiln slag and reducing and tempering agent is 25-35:20-25; the reducing and tempering agent includes coke, albite and borax, and the mass ratio thereof is 10-15:5-7:3-5. Further, the mass ratio of SiO, CaO, $Fe_2O_3$, $Al_2O_3$, ZnO, MnO, CuO, Na O and MgO in zinc rotary kiln slag is 18-22:10-20:20-40:5-10:0.02-8:0.05-6:0.01-2:0.2-2:0.03-3.

2) The reduced iron-containing raw materials weighed according to the formula are mixed and melted at 1450-1500° C. and kept at a temperature of 2-3 hours to obtain a reduced seasoning material melt.

4. The method for synergistically preparing ferrosilicon alloy and glass-ceramics from photovoltaic waste slag and non-ferrous metal smelting iron slag is characterized in that the mass ratio of $SiO_2$, CaO, $Al_2O_3$, $Na_2O$, $K_2O$, MgO and ZnO in the silicon slag is 65-72:12-18:8-12:0.6-2:0.4-1:0.2-1:0.1-1, wherein the silicon element in the silicon slag exists in the form of elemental silicon, silicon carbide and calcite with a mass ratio of 15-30:30-60:5-10.

5. The method for synergistically preparing ferrosilicon alloy and glass-ceramics from photovoltaic waste slag and non-ferrous metal smelting iron slag is characterized in that the conditions for mixing the rotary kiln slag mixture and the silicon slag are as follows: mixing at 1450-1550° C. for 1-2.5 h to form a glass liquid with uniform composition.

6. Further, the method for preparing ferrosilicon alloy and glass-ceramic by using silicon slag and zinc rotary kiln slag is characterized in that the high-temperature glass liquid is transferred or poured into pre-prepared water lower than or equal to 30° C. to form Slag containing Ferrosilicon alloy. Filter out the slag out water, and obtain Ferrosilicon alloy by sorting and drying at 120-150° C.

7. The method for synergistically preparing ferrosilicon alloy and glass-ceramics from photovoltaic waste slag and non-ferrous metal smelting iron slag is characterized in that the above-mentioned water-quenching residue is used as the main material to prepare the glass-ceramic.

The preparation raw material of the glass-ceramic is composed of water quenching residue, quartz and flux clarifying agent, which respectively account for (55-75):(15-35):(8-15) in the total mass percentage of the raw materials.

The flux clarifying agent includes potassium feldspar, fluorite, cerium oxide and sodium nitrate, with a mass ratio of (5-8):(2-4):(1-2):(1-2).

8. The method for preparing Ferrosilicon alloy and glass-ceramic with silicon slag and zinc rotary kiln slag is characterized in that, water quenching residue, quartz and flux clarifier are mixed according to the formula ratio with ball mill and sieve. After fractionation, a basic glass formulation with uniform size is obtained, and the formulation is melted at a high temperature and quenched by water to obtain a basic glass. The melting temperature is 1380-1460° C. and kept for 2-3 hours to form a homogeneous molten glass. Pour the homogeneous glass liquid into pre-prepared water below 30° C. to form glass particles. The glass particles were filtered from of the water and dried at 150-200° C.

9. The water-quenched base glass frit is crushed in a crusher for 25-40 minutes, and the base glass frit is obtained after passing through a 150-200 mesh sieve. Put the above basic glass powder into a crucible and transfer it to a crystallization furnace, heat up to 600-780° C. at a heating rate of 5-15° C./min for 1-3 hours, and then heat up at a temperature of 5-10° C./min The temperature is increased to 970-1100° C. for 1-3 h, and the temperature is lowered to 720-850° C. at a cooling rate of 5-10° C./min for 0.5-2 h and then naturally cooled to room temperature to obtain a glass-ceramic product, which can be widely used In construction, metallurgy, machinery and chemical industry.

Compared with the prior art, the present invention has the following advantages:

(1) The present invention develops silicon slag and zinc rotary kiln slag to prepare high-value Ferrosilicon alloy products, aiming at the problem of reduced performance of glass-ceramics caused by structural heterogeneity of elemental silicon in silicon slag, and the problem of overflow caused by high iron content in zinc rotary kiln slag.

The preparation of ferrosilicon alloy not only realizes the conversion of waste residues to high-value products, but also reduces the content of elemental silicon and iron in the waste residues, which is beneficial to the remaining components in the residues as raw materials for the preparation of glass-ceramics.

(2) This process directly uses the silicon in the silicon slag to combine with the molten reduced iron material to form a ferrosilicon alloy. It does not need to undergo the high temperature decomposition and reduction process of silica (the decomposition temperature is as high as 1900° C.), and only needs to be at a lower temperature (1450-1550° C.). This process greatly reduces the melting temperature and saves the production cost.

(3) Taking advantage of the density difference between the alloy and the waste slag, when the silicon in the silicon slag is combined with the iron-containing material in the reduced state at high temperature, the obtained Ferrosilicon alloy is located in the lower layer, and the reduced waste slag is located in the upper layer. After the layered sample is quenched with water, it is beneficial to obtain high-purity ferrosilicon alloy.

(4) According to the grade of waste slag, the cascade utilization of smelting waste silicon slag and waste lead slag was implemented, and Ferrosilicon alloy and glass-ceramic products were successfully prepared.

In addition, the raw materials used do not need to add harmful gases such as chlorine gas, and the raw materials are green and environmentally friendly, in line with the national policy of turning waste into treasure and saving energy and reducing consumption.

DESCRIPTION OF DRAWINGS

FIG. 1 shows the process flow of using silicon slag and zinc rotary kiln slag to prepare ferrosilicon alloy and glass-ceramic.

PREFERRED EMBODIMENTS

In order to better explain the present invention, the content of the present invention is further illustrated below in conjunction with the embodiments, but the present invention is not limited to the following embodiments.

In the following embodiments, the composition of the zinc rotary kiln slag is composed of $SiO_2$, CaO, $Fe_2O_3$, $Al_2O_3$, ZnO, MnO, CuO, $Na_2O$ and MgO, and the mass ratio between them is 18-22:10-20:20-40:5-10:0.02-8:0.05-6:0.01-2:0.2-2:0.03-3.

The components of silicon slag are $SiO_2$, CaO, $Al_2O_3$, $Na_2O$, $K_2O$, MgO and ZnO, with a mass ratio of 65-72:12-18:8-12:0.6-2:0.4-1:0.2-1:0.1-1.

Wherein, the silicon in the silicon slag exists in the form of elemental silicon, silicon carbide and calcite with a mass ratio of 15-30:30-60:5-10.

The water quenching residue, quartz and flux clarifying agent of the glass-ceramic preparation raw materials account for 55-75:15-35:8-15 of the total mass of the raw materials, wherein the mass ratio of potassium feldspar, fluorite, cerium oxide and sodium nitrate in the fluxing and clarifying agents is 5-8:2-4:1-2:1-2.

Embodiment 1: 65 # Ferrosilicon Alloy

The invention provides a method for preparing Ferrosilicon alloy and glass-ceramic by using silicon slag and zinc rotary kiln slag, and its technological process (shown in FIG. 1) and detailed operation steps are as follows:

The composition of the zinc rotary kiln slag mixture, in terms of mass ratio, includes: 35 parts of rotary kiln slag, 10 parts of coke, 7 parts of albite and 3 parts of borax.

The process of preparing Ferrosilicon alloy is as follows:

(1) According to the mass ratio, weigh 55 parts of silicon slag; and weigh zinc rotary kiln slag mixture including: 25 parts of rotary kiln slag, 10 parts of coke, 7 parts of albite and 3 parts of borax.

(2) The zinc rotary kiln slag mixture weighed according to the formula in step (1) is ground and mixed in a crusher, passed through a 200-mesh sieve, put into a crucible, melted in a high temperature box furnace at 1450° C. for 2 h to obtain a reduced iron-containing material melt.

(3) In step (2), the reduced iron-containing material melt and the silicon slag are mixed and melted at 1450° C. for 2 hours to form a glass melt with uniform components. Transfer or pour the high-temperature glass liquid into pre-prepared water below or equal to 30° C. to form slag containing Ferrosilicon alloy.

Filter out the slag of the water, and the Ferrosilicon alloy was obtained by sorting, and dried at 120° C.

(4) The composition analysis of the Ferrosilicon alloy in step (3) is carried out, and the results are shown in Table 3.

TABLE 3

| Element content (wt %) of 65# Ferrosilicon alloy obtained in Embodiment 1 | | | | | | |
|---|---|---|---|---|---|---|
| / | Element content (wt %) ≤ | | | | | |
| Element | Si | Al | Ca | Mn | C | S |
| Result | 66.5 | 0.01 | 0.03 | 0.05 | 0.06 | 0.002 |

It can be seen that the obtained Ferrosilicon alloy conforms to the GB/T2272-2009.

(5) The glass-ceramic is prepared by using the water quenching residue in step (3) as the main material.

In terms of mass fraction, weigh 55 wt % of the water quenching residue, 35 wt % of quartz, 5 wt % of potassium feldspar, 2 wt % of fluorite, 1 wt % of cerium oxide, and 2 wt % of sodium nitrate.

(6) The raw materials weighed in step (5) are put into a ball mill, mixed and crushed and passed through a 150-mesh sieve to obtain a uniform raw material powder.

The raw material powder was transferred to a crucible and put into a box furnace, melted at 1380° C. for 2 hours to form a homogeneous molten glass liquid.

Pour the homogeneous glass liquid into pre-prepared water below 30° C. to form glass particles. The glass particles were filtered from the water and dried at 150° C.

The basic glass particles obtained in step (6) are crushed in a crusher for 25 minutes, and the basic glass powder is obtained after passing through a 150-mesh sieve.

The above basic glass powder was put into a crucible and transferred to a crystallization furnace, heated to 600° C. at a heating rate of 5° C./min for 1 h, and then heated to 970° C. at a heating rate of 5° C./min for thermal sintering 1 h; and the temperature was lowered to 720° C. at a cooling rate of 5° C./min for 0.5 h, and then cooled to room temperature naturally to obtain a glass-ceramic product.

The Mohs hardness of this product is grade 5, and the flexural strength is 54.18 MPa.

Embodiment 2: 72 # Ferrosilicon Alloy

The invention provides a method for preparing Ferrosilicon alloy and glass-ceramic by using silicon slag and zinc rotary kiln slag, and its technological process (shown in FIG. 1) and detailed operation steps are as follows:

The composition of the zinc rotary kiln slag mixture, in terms of mass ratio, includes: 30 parts of rotary kiln slag, 12 parts of coke, 5 parts of albite and 5 parts of borax.

The process of preparing Ferrosilicon alloy is as follows:

(1) According to the mass ratio, weigh 48 parts of silicon slag; and weigh zinc rotary kiln slag mixture including: 30 parts of rotary kiln slag, 12 parts of coke, 5 parts of albite and 5 parts of borax.

(2) The zinc rotary kiln slag mixture weighed according to the formula in step (1) is ground and mixed in a crusher, passed through a 200-mesh sieve, put into a crucible, melted in a high temperature box furnace at 1480° C. for 3 h to obtain a reduced iron-containing material melt.

(3) In step (2), the reduced iron-containing material melt and the silicon slag are mixed and melted at 1500° C. for 2 hours to form a glass melt with uniform components. Transfer or pour the high-temperature glass liquid into pre-prepared water below or equal to 30° C. to form slag containing Ferrosilicon alloy.

Filter out the slag of the water, and the Ferrosilicon alloy was obtained by sorting, and dried at 150° C.

(4) The composition analysis of the Ferrosilicon alloy in step (3) is carried out, and the results are shown in Table 4.

TABLE 4

Element content (wt %) of 72# Ferrosilicon alloy obtained in Embodiment 2

| / | Element content (wt %) ≤ | | | | |
|---|---|---|---|---|---|
| Element | Si | Al | Ca | Mn | C | S |
| Result | 73.3 | 0.02 | 0.01 | 0.02 | 0.05 | 0.003 |

It can be seen that the obtained Ferrosilicon alloy conforms to the GB/T2272-2009.

(5) The glass-ceramic is prepared by using the water quenching residue in step (3) as the main material.

In terms of mass fraction, weigh 65 wt % of the water quenching residue, 20 wt % of quartz, 8 wt % of potassium feldspar, 3 wt % of fluorite, 2 wt % of cerium oxide, and 2 wt % of sodium nitrate.

(6) The raw materials weighed in step (5) are put into a ball mill, mixed and crushed and passed through a 180-mesh sieve to obtain a uniform raw material powder.

The raw material powder was transferred to a crucible and put into a box furnace, melted at 1400° C. for 3 hours to form a homogeneous molten glass liquid.
Pour the homogeneous glass liquid into pre-prepared water below 30° C. to form glass particles. The glass particles were filtered from the water and dried at 180° C.
The basic glass particles obtained in step (6) are crushed in a crusher for 30 minutes, and the basic glass powder is obtained after passing through a 180-mesh sieve.

The above basic glass powder was put into a crucible and transferred to a crystallization furnace, heated to 700° C. at a heating rate of 10° C./min for 2 h, and then heated to 1000° C. at a heating rate of 8° C./min for thermal sintering 2 h; and the temperature was lowered to 800° C. at a cooling rate of 8° C./min for 1 h, and then cooled to room temperature naturally to obtain a glass-ceramic product.

The Mohs hardness of this product is grade 6, and the flexural strength is 94.35 MPa.

Embodiment 3: 75 # Ferrosilicon Alloy and Glass-Ceramic

The invention provides a method for preparing Ferrosilicon alloy and glass-ceramic by using silicon slag and zinc rotary kiln slag, and its technological process (shown in FIG. 1) and detailed operation steps are as follows:

The composition of the zinc rotary kiln slag mixture, in terms of mass ratio, includes: 35 parts of rotary kiln slag, 15 parts of coke, 6 parts of albite and 4 parts of borax.

The process of preparing Ferrosilicon alloy is as follows:

(1) According to the mass ratio, weigh 40 parts of silicon slag; and weigh zinc rotary kiln slag mixture including: 35 parts of rotary kiln slag, 15 parts of coke, 6 parts of albite and 4 parts of borax.

(2) The zinc rotary kiln slag mixture weighed according to the formula in step (1) is ground and mixed in a crusher, passed through a 200-mesh sieve, put into a crucible, melted in a high temperature box furnace at 1500° C. for 3 h to obtain a reduced iron-containing material melt.

(3) In step (2), the reduced iron-containing material melt and the silicon slag are mixed and melted at 1550° C. for 2 hours to form a glass melt with uniform components. Transfer or pour the high-temperature glass liquid into pre-prepared water below or equal to 30° C. to form slag containing Ferrosilicon alloy.

Filter out the slag of the water, and the Ferrosilicon alloy was obtained by sorting, and dried at 150° C.

(4) The composition analysis of the Ferrosilicon alloy in step (3) is carried out, and the results are shown in Table 5.

TABLE 5

Element content (wt %) of 75# Ferrosilicon alloy obtained in Embodiment 3

| / | Element content (wt %) ≤ | | | | |
|---|---|---|---|---|---|
| Element | Si | Al | Ca | Mn | C | S |
| Result | 76.8 | 0.04 | 0.05 | 0.02 | 0.03 | 0.002 |

It can be seen that the obtained Ferrosilicon alloy conforms to the GB/T2272-2009.

(5) The glass-ceramic is prepared by using the water quenching residue in step (3) as the main material.

In terms of mass fraction, weigh 75 wt % of the water quenching residue, 15 wt % of quartz, 86 wt % of potassium feldspar, 2 wt % of fluorite, 1 wt % of cerium oxide, and 1 wt % of sodium nitrate.

(6) The raw materials weighed in step (5) are put into a ball mill, mixed and crushed and passed through a 200-mesh sieve to obtain a uniform raw material powder.

The raw material powder was transferred to a crucible and put into a box furnace, melted at 1460° C. for 3 hours to form a homogeneous molten glass liquid.
Pour the homogeneous glass liquid into pre-prepared water below 30° C. to form glass particles. The glass particles were filtered from the water and dried at 200° C.
The basic glass particles obtained in step (6) are crushed in a crusher for 40 minutes, and the basic glass powder is obtained after passing through a 200-mesh sieve.

The above basic glass powder was put into a crucible and transferred to a crystallization furnace, heated to 780° C. at a heating rate of 15° C./min for 3 h, and then heated to 1100° C. at a heating rate of 10° C./min for thermal sintering 3 h; and the temperature was lowered to 850° C. at a cooling rate of 8° C./min for 2 h, and then cooled to room temperature naturally to obtain a glass-ceramic product.

The Mohs hardness of this product is grade 5, and the flexural strength is 73.19 MPa.

Comparative Example 1

This comparative example provides a method for preparing ferrosilicon alloy and glass-ceramic by using silicon slag and zinc rotary kiln slag. All are the same as Embodiment 2 except no coke was added.

Since no coke was added in Comparative Example 1, the content of elemental iron in the zinc rotary kiln slag was relatively low, and it was difficult to combine with elemental silicon in the silicon slag in the mixing step, resulting in failure to obtain a Ferrosilicon alloy.

To sum up, the present invention develops silicon slag and rotary kiln slag to prepare Ferrosilicon alloy and microcrystalline glass to solve the problem of reduced performance of glass-ceramic caused by structural heterogeneity of elemental silicon in silicon slag, and the problem of overflow caused by high iron content in zinc rotary kiln slag.

High-value Ferrosilicon alloy products are obtained through the chemical action of iron in zinc rotary kiln slag and silicon in silicon slag, and glass-ceramic is obtained after further quenching and tempering, melting, forming, annealing and heat treatment of the remaining water-quenched residue, which realizes coordinated utilization of solid waste in different regions.

This process directly uses the silicon in the silicon slag to combine with the molten reduced iron material to form a Ferrosilicon alloy. It does not need to undergo the high temperature decomposition and reduction process of silica (the decomposition temperature is as high as 1900° C.), and only needs to be at a lower temperature (1450-1550° C.).

This process greatly reduces the melting temperature and saves the production cost.

In addition, using the density difference between the alloy and the waste slag, when the silicon in the silicon slag is combined with the iron-containing material in the reduced state at high temperature, the Ferrosilicon alloy formed is located in the lower layer of the melt, and the reduced waste slag is located in the upper layer. The sample is quenched and sorted by water. High-purity Ferrosilicon alloy can be formed.

The raw material residue and process used do not involve harmful gases such as chlorine gas, which conform to the national policy of turning waste into treasure and saving energy and reducing consumption.

We claim:

1. A method for preparing ferrosilicon alloy and glass-ceramics from silicon slag and zinc rotary kiln slag characterized in that:
    raw materials include zinc rotary kiln slag mixture and silicon slag, whose mass percentages are 45-60 and 40-55 respectively, and the sum of mass percentage of zinc rotary kiln slag mixture and silicon slag is 100%;
    chemical components of the silicon slag are: $SiO_2$, CaO, $Al_2O_3$, $Na_2O$, $K_2O$, MgO, and ZnO, wherein the silicon in the silicon slag exists in the form of elemental silicon, silicon carbide and calcite;
    the zinc rotary kiln slag mixture includes zinc rotary kiln slag and a reducing and tempering agent, wherein the reducing and tempering agent includes coke, albite, and borax;

the method includes the following main steps:
    (1) prepare a reduced iron-containing material, and weigh rotary kiln slag, coke, albite and borax according to the formula to form a rotary kiln slag batch, and the batch is melted to form a reduced iron-containing material;
    (2) prepare ferrosilicon alloy and glass-ceramic, mix and melt the reduced iron-containing material formed in step (1) with silicon slag, and clarify to form a base glass liquid, and the obtained base glass liquid is quenched and sorted to obtain a ferrosilicon alloy; the residue is further tempered, melted, quenched and crystallized to obtain the glass-ceramic;
    the melting temperature of the rotary kiln slag batch material is 1450-1500° C., and the temperature is kept for 2-3 hours to obtain the reduced iron-containing material; the mixing temperature of the reduced iron-containing material and the silicon slag is 1450-1550° C., and the mixing time is 1-2.5 h, to form a uniform base glass liquid;
    transfer or pour the molten base glass liquid into pre-prepared water below or equal to 30° C. to form ferrosilicon alloy and water quenching residue; filter the alloy slag from the water, and get the ferrosilicon alloy after sorting, and dried at 120-150° C.

2. The method for preparing ferrosilicon alloy and glass-ceramics from silicon slag and zinc rotary kiln slag according to claim 1 characterized in that:
    the mass ratio of SiO, CaO, $Fe_2O_3$, $Al_2O_3$, ZnO, MnO, CuO, Na O and MgO in zinc rotary kiln slag is 18-22:10-20:20-40:5-10:0.02-8:0.05-6:0.01-2:0.2-2:0.03-3;
    the mass ratio of $SiO_2$, CaO, $Al_2O_3$, $Na_2O$, $K_2O$, MgO and ZnO in the silicon slag is 65-72:12-18:8-12:0.6-2:0.4-1:0.2-1:0.1-1; wherein the silicon element in the silicon slag exists in the form of elemental silicon, silicon carbide and calcite with a mass ratio of 15-30:30-60:5-10.

3. The method for preparing ferrosilicon alloy and glass-ceramics from silicon slag and zinc rotary kiln slag according to claim 1 characterized in that:
    the mass ratio of zinc rotary kiln slag and reducing and tempering agent is 25-35:20-25;
    the reducing and tempering agent includes coke, albite and borax, and the mass ratio thereof is 10-15:5-7:3-5.

4. The method for preparing ferrosilicon alloy and glass-ceramics from silicon slag and zinc rotary kiln slag according to claim 1 characterized in that:
    the preparation raw material of the glass-ceramic is composed of water quenching residue, quartz and flux clarifying agent, which respectively account for 55-75:15-35:8-15 in the total mass percentage of the raw materials; the flux clarifying agent includes potassium feldspar, fluorite, cerium oxide and sodium nitrate, with a mass ratio of (5-8):(2-4):(1-2):(1-2);
    first, the water quenching residue, quartz and flux clarifying agent are mixed according to the formula ratio, processing ball mill and sieve to obtain a base glass formulation with uniform size;
    the melting temperature is 1380-1460° C., and the temperature is kept for 2-3 h to form a homogeneous molten glass liquid; the homogeneous glass liquid is poured into pre-prepared water below or equal to 30° C. to form glass particles; the glass particles are filtered from the water and dry at 150-200° C.;

the basic glass frit after water quenching is crushed in a crusher for 25-40 minutes, and the basic glass powder is obtained after passing through a 150-200 mesh sieve; put the above basic glass powder into a crucible and transfer it to a crystallization furnace, heat up to 600-780° C. at a heating rate of 5-15° C./min for 1-3 hours, and then heat up at a temperature of 5-10° C./min The temperature is increased to 970-1100° C. for 1-3 h, and the temperature is lowered to 720-850° C. at a cooling rate of 5-10° C./min for 0.5-2 h and then naturally cooled to room temperature to obtain a glass-ceramic product.

* * * * *